United States Patent
Tanabe (10) Patent No.: US 7,574,105 B2
(45) Date of Patent: Aug. 11, 2009

(54) DEVICE, SYSTEM, METHOD AND PROGRAM FOR DATA PROCESSING, RECORDING MEDIUM STORING THE PROGRAM, AND PLAYER

(75) Inventor: Manabu Tanabe, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 959 days.

(21) Appl. No.: 10/923,090

(22) Filed: Aug. 23, 2004

(65) Prior Publication Data

US 2005/0057545 A1 Mar. 17, 2005

(30) Foreign Application Priority Data

Aug. 27, 2003 (JP) ............... 2003-209008

(51) Int. Cl.
H04N 5/76 (2006.01)
H04N 7/00 (2006.01)
(52) U.S. Cl. ........................... 386/69; 386/95
(58) Field of Classification Search ............. 386/1, 386/45–46, 95–96, 125–126, 69–70
See application file for complete search history.

(56) References Cited

U.S. PATENT DOCUMENTS

| 5,706,097 | A | 1/1998 | Schelling et al. ............ 358/296 |
| 2002/0081099 | A1 | 6/2002 | Tsumagari et al. ............ 386/95 |
| 2003/0026594 | A1* | 2/2003 | Shiiyama ..................... 386/69 |
| 2004/0036790 | A1* | 2/2004 | Dow et al. ............ 348/333.05 |

FOREIGN PATENT DOCUMENTS

| EP | 0 917 371 A2 | 5/1999 |
| EP | 1 148 412 A2 | 10/2001 |
| JP | 2002-218285 | 8/2002 |
| JP | 2004-32375 | 1/2004 |
| WO | WO 99/40587 | 8/1999 |

OTHER PUBLICATIONS

European Search Report of Nov. 17, 2005.

* cited by examiner

*Primary Examiner*—Thai Tran
*Assistant Examiner*—Nigar Chowdhury
(74) *Attorney, Agent, or Firm*—Kratz, Quintos & Hanson, LLP (57) ABSTRACT

A data processor acquires video data and audio data and, after processing them appropriately, stores them on an optical disc and/or an HDD (300). When displaying an index of the images representing the acquired video data, thumbnail images are generated by means of a decoder (480) and an AV processor (460) on the basis of the data of the data system recorded along with the video data. The thumbnail images of the data system that can be used for displaying images are displayed as index, while the thumbnail images of any data systems other than the above data system are replaced by respective invalid images to tell that they cannot be displayed. Thus, an index can be displayed with a simple arrangement if data of different data systems are recorded.

24 Claims, 4 Drawing Sheets

DEVICE, SYSTEM, METHOD AND PROGRAM FOR DATA PROCESSING, RECORDING MEDIUM STORING THE PROGRAM, AND PLAYER

BACKGROUND OF THE INVENTION

1. Field of the Invention

The present invention relates to a device, a system, a method and a program for processing data so as to be output for use, a recording medium storing the program and a player.

2. Description of Related Art

Conventionally, recording devices adapted to readably recording video data of moving images on recording mediums such as hard disks (HDDs) and optical discs have been popularly utilized. Arrangements for displaying a list of still images (also referred to as thumbnail images) representing respective sets of video data of moving images and/or other images stored in a recording medium on a display device are known (see, Japanese Patent Laid-Open Publication No. 2002-218285, p. 3, left column to p. 5, left column, FIG. 2).

The above-cited patent document specifically describes a technique of displaying an image of the PAL (Phase Alternation by Line) system in a display window of a liquid crystal display panel by thinning out the scanning lines thereof while displaying an image of the NTSC (National Television System Committee) system defined by the National Television System Committee of the United States of America on the display panel.

When a number of sets of video data of different systems are recorded in a recording medium and displaying a thumbnail index image of the sets of video data on the display device, it may be conceivable to display each of the thumbnail images in a display window by thinning out the scanning lines thereof. However, if compared with the arrangement of displaying an image in a display window by thinning out the scanning lines thereof as described in the above patent document, it will require a complicated processing operation to display a plurality of images of different systems in a display window by thinning out the scanning lines of each of the images. Thus, such an operation can be carried out only with a reduced productivity and at high cost.

SUMMARY OF THE INVENTION

An object of the present invention is to provide a device, a system, a method and a program for processing data with a simple arrangement if data of different systems are to be dealt with, a recording medium storing the program and a player.

A data processor according to an aspect of the present invention for processing data so as to make them adapted to be output, the processor includes: a specific image acquirer for acquiring a plurality of specific images correlated to the data; a data system determiner for determining the data system of each of the specific images; and an index display controller for causing a display unit to display an index of the specific images of a data system out of the plurality of acquired specific images.

A data processor according to another aspect of the present invention for processing data so as to make them adapted to be output, the processor includes: a specific image acquirer for acquiring a plurality of specific images correlated to the data; a data system determiner for determining the data system of each of the specific images; and an index display controller for causing a display unit to display an index of the specific images of a data system out of the plurality of acquired specific images, in which the index display controller being adapted to display specific images of the data systems other than the data system of the specific images displayed on the display unit as invalid images not adapted to be displayed on the display unit along with the specific images to be displayed on the display unit.

A data processing system according to still another aspect of the present invention includes: the above data processor; and a host device connected to the data processor via a network and adapted to transmit desired data to the data processor.

A data processing system according to further aspect of the present invention includes: a host device having a storage for stores data and a transmitter for transmitting the data to a network; and a terminal device having a specific image acquirer for acquiring a plurality of specific images correlated to the data transmitted to the network, a data system determiner for determining the data system of each of the specific images and an index display controller for causing a display unit to display an index of the specific images of a data system out of the plurality of acquired specific images, in which the index display controller displays specific images of the data systems other than the data system of the specific images displayed on the display unit as invalid images not adapted to be displayed on the display unit along with the specific images to be displayed on the display unit.

A data processing system according to still further aspect of the present invention includes: a host device having a storage for stores data and a transmitter for transmitting the data to a network; and a terminal device having a data acquirer for acquiring the data transmitted to the network, a specific image generator for generating specific images of the data system same as the data system of the data so as to represent the contents of the data and an index display controller for causing a display unit to display an index of the specific images generated by the specific image generator, in which the index display controller displays specific images of the data systems other than the data system of the specific images displayed on the display unit as invalid images not adapted to be displayed on the display unit along with the specific images to be displayed on the display unit.

A data processing method according to still further aspect of the present invention for processing data so as to make them adapted to be output, includes the steps of: acquiring a plurality of specific images correlated to the data; determining the data system of each of the specific images; and causing a display unit to display an index of the specific images of a data system out of the plurality of specific images.

A data processing program according to still further aspect of the present invention executes the above data processing method by a computer.

A recording medium according to still further aspect of the present invention stores the above data processing program in a manner readable by a computer.

A player according to still further aspect of the present invention includes: a display unit; and the above data processor adapted to cause the display unit to display specific images.

DETAILED DESCRIPTION OF PREFERRED EMBODIMENT(S)

Firstly, an embodiment of the present invention will be described by referring to the related ones of the accompanying drawings. This embodiment is a player adapted to replay images, which are typically moving images of the contents of video works, stored in recording mediums such as hard disks (HDs) and/or optical discs. However, it should be noted here that recording mediums that can be used for the purpose of the present invention are not limited to HDs and optical discs but include memory cards and other recording mediums. Additionally, the present invention is applicable not only to video data such as moving images, but also to various other data to be processed and output for use. Still additionally, while the present invention is described below in terms of an arrangement for displaying thumbnail images prepared for respective sets of video data, it can also be used for applications where thumbnail images of other data. Furthermore, thumbnail images that can be used for the purpose of the invention are not limited to those showing parts of video data stored in recording mediums but include those that are newly prepared from video data, those that are contained in original video data and those stored along with corresponding video data in DVD-ROMs (digital versatile discs—read only memories).

[Configuration of Player]

Figure 1:
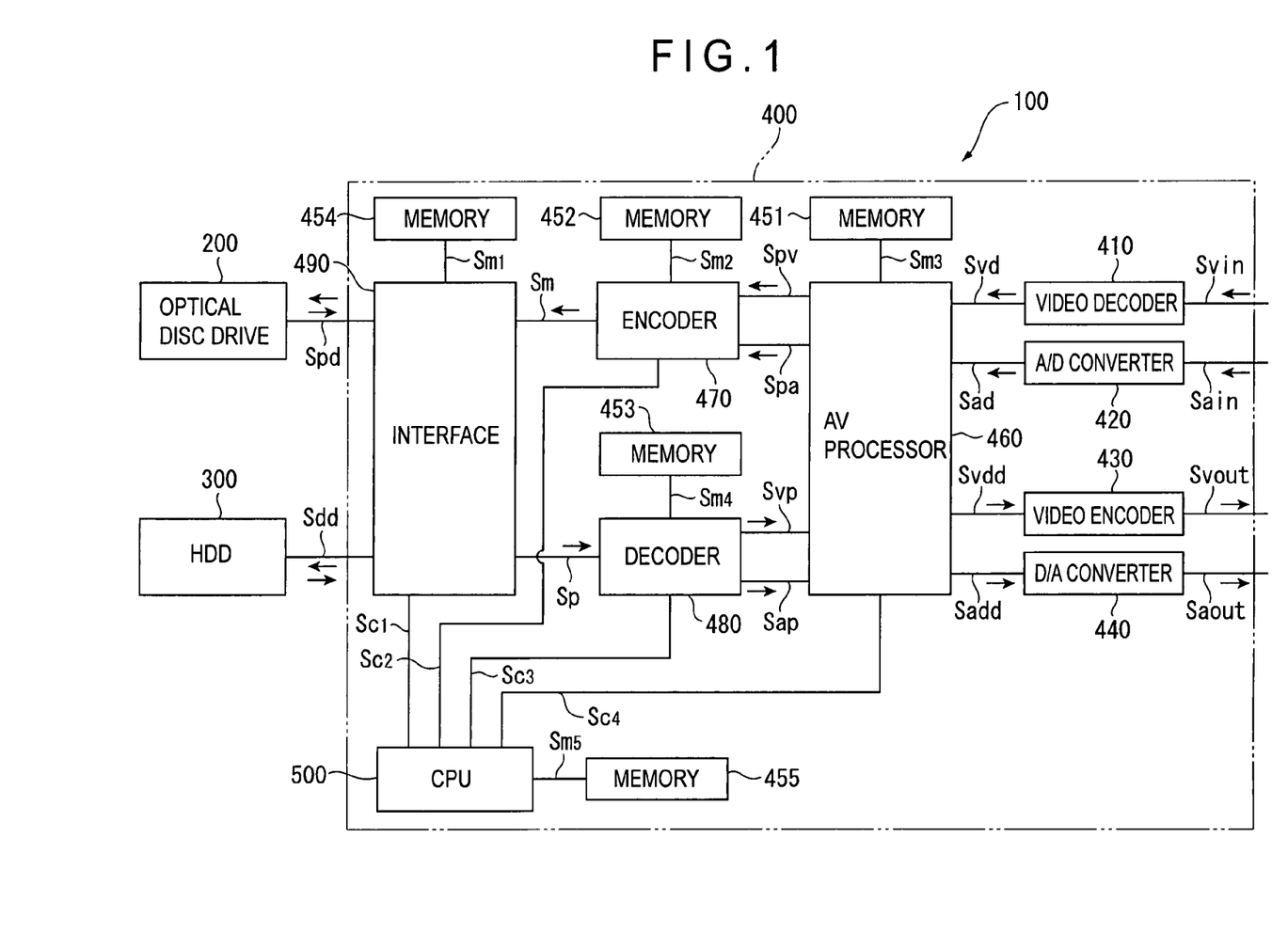
FIG. 1 is a schematic block diagram of an embodiment of player according to the present invention.

Now, the configuration of player will be described summarily by referring to FIG. 1. FIG. 1 is a schematic block diagram of the embodiment of player according to the present invention.

In FIG. 1, reference symbol 100 generally denotes the player. As described above, the player 100 reproduces video/audio data of moving images that are stored in recording mediums such as HDs and/or optical discs as well as those that are externally acquired and also special video data of still images that represent video/audio data of moving images so as to display a thumbnail image. The player 100 has an optical disc drive 200 that operates as a storage, a hard disk drive (HDD) 300 that also operates as a storage, a display device that operates as a display unit that is part of an output section (not shown), a sounding unit that is also part of the output section and a data processor 400.

The optical disc drive 200 is adapted to removably receive an optical disc (not shown) that is a recording medium such as a CD (compact disc) or a DVD (digital versatile disc) so as to optically record various data on and read various data from the optical disc. The optical disc drive 200 is connected to the data processor 400 and acquires data output from the data processor 400 so as to record them appropriately on the optical disc and output the data it reads from the optical disc to the data processor 400. The optical disc drive 200 may be adapted only to read recorded data.

The HDD 300 is provided with a hard disk that is typically a magnetic disk (to be referred to as HD hereinafter) and operates as recording medium. It magnetically records various data on and reads various data from the HD. The HDD 300 is connected to the data processor 400 and acquires data output from the data processor 400 so as to record them appropriately on the HD and output the data it reads from the HD to the data processor 400.

If the optical disc and the HD store data including audio data of pieces of music and/or video data of movies and/or broadcast TV programs, the audio data of the pieces of music and/or the video data of movies and/or broadcast TV programs, they are stored as so many identifiable works with their respective titles. A title may represent a movie that contains audio data and video data, a series of still images, a piece of music or the like. When recording the video data of a work, the still image that can be used to clearly identify the work and is included in the still images containing the title of the work is specified in advance and the still image is recorded with the video data of the work as thumbnail image or as time base positional data of image.

The display device is connected to the data processor 400 and acquires various video data output from the data processor 400 so as to reproduce, or display, the images of the acquired video data. The display device may be selected from a variety of displays including liquid crystal display panels, organic EL (electroluminescence) panels, PDPs (plasma display panels), CRTs (cathode-ray tubes), FEDs (field emission displays) and electro-phoresis display panels.

The sounding unit is connected to the data processor 400 and acquires various audio data including those of pieces of music that are output from the data processor 400 so as to replay, or sound, the sounds of the acquired audio data as music and/or speeches. The sounding unit typically includes an amplifier that is connected to the data processor 400 and amplifies the audio data output from the data processor 400 and a speaker that is connected to the amplifier and outputs the amplified audio data as sounds. The output section of the invention includes a display device and a sounding unit. Therefore, the present invention may be applied to a television set that is composed of an integrated combination of a display device and a sounding unit. A player according to the invention may alternatively have an output section that only includes a display device.

The data processor 400 acquires audio data of music and so on and video data and processes the audio data and the video data it acquires so that they may be respectively output from the sounding unit and the display device. It also operates to display a thumbnail index image on the display device. The data processor 400 includes a video decoder 410 that also operates as data acquirer and data system determiner, an A/D (analog/digital) converter 420, a video encoder 430, a D/A (digital/analog) converter 440, a plurality of memories 451, 452, 453, 454, 455, an AV (audio/video) processor 460 that also operates as a specific video data generator, index display controller, display windows definer and replacing unit, an encoder 470, a decoder 480 that also operates as specific video data acquirer, an interface 490 that also operates as specific video data acquirer and data acquirer and a CPU (central processing unit) 500 that also operates as index display controller, number of images recognizer and computer. The essential components of the data processor 400 are the video encoder 430, the D/A converter 440, the AV processor 460, the decoder 480 and the CPU 500.

The video decoder 410 is connected to the CPU 500 and the AV processor 460. The video decoder 410 converts input video data Svin that are input to a video input terminal (not shown) arranged in the data processor 400 as analog signals under the control of the CPU 500, into digital signals. Additionally, under the control of the CPU 500, the video decoder 410 decodes the input video data Svin in a predefined manner to generate digital video data Svd and then outputs the generated digital video data to the AV processor 460.

The video decoder 410 also recognizes the data system of the video data input to it when it converts them into digital signals or decodes them and decodes the video data in a manner corresponding to the recognized data system. The data systems it can recognize include the NTSC (National Television System Committee) system defined by the National Television System Committee of the United States of America for 525 color television scanning lines, the PAL (phase alternation by line) system for 625 color television scanning lines, the SECAM (sequential color and memory) system for 625 color television scanning lines that uses color signals different from those of the PAL system, any other terrestrial analog broadcasting systems, high definition television systems, terrestrial digital broadcasting systems. The video decoder 410 recognizes these television systems on the basis of the number of scanning lines of each thumbnail image it receives and the color signals on the colors to be used for displaying the thumbnail image.

The A/D converter 420 is connected to the CPU 500 and the AV processor 460. The A/D converter 420 converts the input audio data Sain that are input from an audio input terminal (not shown) arranged in the data processor 400 as analog signals into digital signals and outputs the digital signals to the AV processor 460 as digital audio data Sad under the control of the CPU 500.

The video encoder 430 is connected to the CPU 500 and the AV processor 460. The video encoder 430 acquires the processed video data Svdd and the video data for thumbnail images, which will be described hereinafter, as output from the AV processor 460 along with invalid video data and performs predefined operations on the processed video data Svdd, the video data for thumbnail images and the invalid video data for system conversion and analog conversion to generate output video data Svout in the form of analog signals under the control of the CPU 500. The generated output video data Svout are then output to a video output terminal (not shown) arranged in the data processor 400 and reproduced, or displayed, on the display device that is connected to the video output terminal.

The D/A converter 440 is connected to the CPU 500 and the AV processor 460. The D/A converter 440 acquires the processed audio data Sadd output from the AV processor 460 and performs predefined operations on the processed audio data Sadd for analog conversion to generate output audio data Saout in the form of analog signals under the control of the CPU 500. The generated output audio data Saout are then output to an audio output terminal (not shown) arranged in the data processor 400 and reproduced as music, or output as sounds, from the sounding unit connected to the audio output terminal. More specifically, the output audio data Saout are amplified by the amplifier connected to the audio output terminal and the amplified output audio data Saout are output as sounds from the speaker.

The AV processor 460 is connected to the nonvolatile memory 451 and exchanges necessary data with the memory 451 as memory signals Sm3. The AV processor 460 is also connected to the CPU 500, the video decoder 410 and the A/D converter 420. The AV processor 460 acquires the digital video data Svd output from the video decoder 410 and the digital audio data Sad output from the A/D converter 420 and performs predetermined pre-processing operations on the acquired data according to control signal Sc4 from the CPU 500. The AV processor 460 then outputs the processed data as processed video data Spv and processed audio data Spa. The AV processor 460 is also connected to the decoder 480, the video encoder 430 and the D/A converter 440. The AV processor 460 acquires the decoded video data Svp, the decoded audio data Sap and the decoded thumbnail video data output from the decoder 480 and performs predefined post-processing operations on the acquired data to generate processed video data Svdd, processed audio data Sadd and thumbnail video data according to control signal Sc4 from the CPU 500. Then, the AV processor 460 outputs the processed video data Svdd, the processed audio data Sadd and the thumbnail video data it generates to the video encoder 430 and the D/A converter 440 respectively.

The AV processor 460 also generates thumbnail video data for thumbnail images from the digital video data Svd or the processed video data Spv according to control signal Sc4 from the CPU 500. The thumbnail video data may be video data generated by dimensionally reducing a still image of a video work. Alternatively, the thumbnail video data contained in the video data of the original work may be used. The thumbnail video data are correlated to the processed video data Spv and integrally output with the processed video data Spv to the encoder 470.

The AV processor 460 further generates invalid video data for invalid images according to the data system of the video data that is recognized when the video data are decoded by the video decoder 410. Invalid video data are video data of thumbnail images of display systems with which images formed by the video data cannot be displayed. An invalid image to be used may be selected from an image stored in advance in the memory 455, an image showing a monochromatic (e.g., black) background, an image where the color of the background of the thumbnail index appears, an image formed by combining any of the above image and so on so long as the viewer can recognize that the image is different from the other thumbnail images of the thumbnail index.

Figure 2:
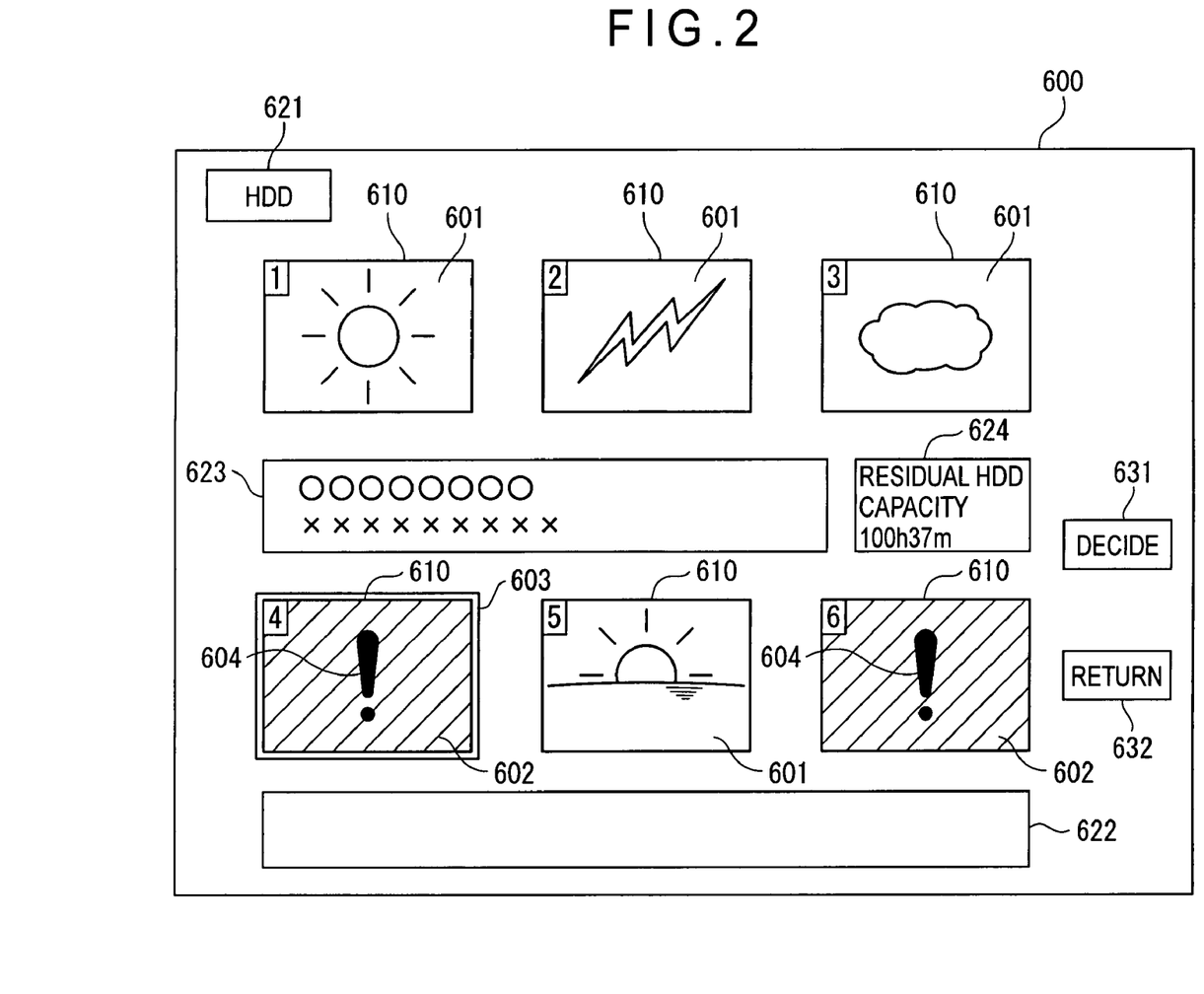
FIG. 2 is a schematic conceptual view of a display screen of the embodiment, displaying a thumbnail index image.

The AV processor 460 exchanges necessary data with the memory 451 as memory signal Sm3 and generates a thumbnail index image 600 as shown in FIG. 2 that is formed by appropriately combining thumbnail images according to control signal Sc4 from the CPU 500 on the basis of the format for displaying a thumbnail index image, which will be described hereinafter. Then, it appropriately outputs data on the generated thumbnail index image 600 to the video encoder 430 and causes the display device to appropriately process the data and display the thumbnail index image 600. More specifically, it defines a thumbnail window 610 for displaying thumbnail images 601, the number of which is recognized by the CPU 500, and generates a thumbnail index image 600 by combining the thumbnail images 601 and invalid images 602 to be displayed in the respective thumbnail window 610.

The encoder 470 is connected to the nonvolatile memory 452 and exchanges necessary data with the memory 452 as memory signals Sm2. The encoder 470 is also connected to the CPU 500, the AV processor 460 and the interface 490. The encoder 470 acquires the processed video data Spv, the processed audio data Spa and the thumbnail video data output from the AV processor 460 and performs necessary processing operations on the acquired data including synthesizing operations and coding operations for the predefined format so as to output the processed data to the interface 490 as synthesized data Sm according to control signal Sc2 from the CPU 500.

The decoder 480 is connected to the nonvolatile memory 453 and exchanges necessary data with the memory 453 as memory signals Sm4. The decoder 480 is also connected to the CPU 500, the interface 490 and the AV processor 460. The decoder 480 acquires reproduced data Sp output from the interface 490 according to the control signal Sc3 from the CPU 500 and performs necessary processing operation on the acquired data including separating operations for separating the video data, the audio data and the thumbnail video data from the reproduced data Sp and decoding operations for decoding the video data, the audio data and the thumbnail video data so as to output the decoded video data Svp, the decoded audio data Sap and the decoded thumbnail video data to the AV processor 460. If thumbnail video data are acquired in advance as reproduced data Sp, the reproduced data Sp are processed for decoding. The thumbnail video data are generated either by the decoder 480 or by the AV processor 460.

The interface 490 is connected to the volatile memory 454 and exchanges necessary data with the memory 454 as memory signals Sm1. The interface 490 is connected to the CPU 500, the encoder 470, the decoder 480, the optical disc drive 200 and the HDD 300. The interface 490 acquires the synthesized data Sm output from the encoder 470 according to the control signal Sc1 from the CPU 500 and outputs them as record data Spd to the optical disc drive 200 so as to have the optical disc drive 200 optically record the record data Spd on the optical disc mounted in the optical disc drive 200. Additionally, the interface 490 acquires the synthesized data Sm output from the encoder 470 according to the control signal Sc1 from the CPU 500 and outputs them as record data Sdd to the HDD 300 so as to have the HDD 300 magnetically record the record data Sdd on the HD.

The interface 490 also causes the optical disc drive 200 to read the video data and the audio data stored on the optical disc according to the control signal Sc1 from the CPU 500 and acquires them as record data Spd. The interface 490 also causes the HDD 300 to read the video data and the audio data stored on the HD according to the control signal Sc1 from the CPU 500 and acquires them as record data Sdd. The interface 490 then outputs either the record data Spd or the record data Sdd to the decoder 480 as reproduced data Sp, exchanging necessary data with the memory 454 as memory signals Sm1 according to the control signal Sc1 from the CPU 500.

The synthesized data Sm are converted either into record data Spd or record data Sdd by the interface 490 typically according to an input operation of selecting either the optical disc drive 200 or the HDD 300 that is performed at an input operation section (not shown) for the recording operation. Additionally, either the record data Spd or the record data Sdd are selected also according to an input operation that is also performed at the input operation section. Preferably, thumbnail video data are output to the HDD 300 as record data Sdd because the HDD 300 allows a relatively high access speed. If the synthesized data Sm produced on the basis of video data are to be recorded by the optical disc drive 200, they may be recorded by the HDD 300 if they are correlated to the video data. The thumbnail video data may be output to the optical disc drive 200 as record data Spd and recorded by the optical disc drive 200. Alternatively, they may be recorded by both the optical disc drive 200 and the HDD 300.

The memory 455 is typically a nonvolatile memory and connected to the CPU 500. The memory 455 stores the memory signals Sm5 output from the CPU 500 so that they may be appropriately output from it. Additionally, the memory 455 stores the various programs that are developed on the OS (operating system) for controlling the entire operation of the player 100.

The CPU 500 is connected to the memory 455 and exchanges necessary data with the memory 455 as memory signals Sm5. The CPU 500 is also connected to the input operation section (not shown) and acquires operation signals output from the input operation section in response to predetermined input operations performed at the input operation section so as to define various control operations. Then, the CPU 500 appropriately generates and outputs various control signals Sc1, Sc2, Sc3, Sc4 according to the defined control operations. The CPU 500 is provided with a number of images recognizer (not shown) as a program.

The number of images recognizer recognizes the number of titles recorded in the optical disc and the HD, which is the number of the thumbnail images to be displayed. More specifically, it controls the interface 490 to appropriately drive the optical disc drive 200 and the HDD 300 in order to recognize the number of titles in the optical disc and the HD. The data on the recognized number are output to the AV processor 460 appropriately along with a control signal Sc4.

(Configuration of Thumbnail Index)

Now, a thumbnail index will be described by referring to the related drawings. FIG. 2 is a schematic conceptual view of a display screen of the embodiment, displaying a thumbnail index image.

Referring to FIG. 2, reference symbol 600 denotes an exemplary thumbnail index image. The thumbnail index image 600 is displayed on the display device by the AV processor 460 under the control of the CPU 500 typically on the basis of the video data of the thumbnail index image stored in advance in the memory 455. The thumbnail index image 600 includes a plurality of thumbnail windows 610 for displaying thumbnail images 601 and/or invalid images 602. Predetermined serial numbers typically starting from 1 are allocated to the respective thumbnail windows 610. In the following description, it is assumed that the thumbnail index image 600 displays thumbnails of video works in the NTSC system and those in the PAL system that are different from each other in terms of scanning line system. In FIG. 2, thumbnail windows 610 are adapted to display thumbnail images of video works in the PAL system, whereas invalid images 602 are thumbnail images of video works in the NTSC system. While a total of six thumbnail windows 610 are shown in FIG. 2, the present invention is by no means limited to six thumbnail windows and the thumbnail index image 600 may have a plurality of thumbnail windows 610 whose number is other than six. While an invalid image sign 604 is superimposed on each invalid image 602, which is a black background image, in FIG. 2, the present invention is by no means limited thereto and the invalid image 602 may be any of the images described above.

The thumbnail index image 600 also includes a plurality of text boxes 621, 622, 623, 624. The text box 621 displays the recording device currently connected to the data processor 400, which is either the optical disc drive 200 or the HDD 300. In other words, it shows the recording device where the video data for displaying thumbnail images 601 are stored. When, for example, cursor 603 of the display screen is moved there, a list of the recording devices connected to the display device as recognized by the CPU 500 is displayed in the text box 621 so that a user may select any of them. However, it may alternatively be so arranged that the text box 621 displays not a list of recording devices but the recording device selected by the user operating the input operation section.

The text box 622 displays a text that corresponds to the image, which is a thumbnail image 601 or an invalid image 602, that is being displayed in the thumbnail window 610 to which the cursor 603 is moved by an input operation performed at the input operation section. When, for example, the selected thumbnail window 610 displays the invalid image 602, a text telling that the corresponding thumbnail image 601 cannot be displayed there, e.g., a text that reads as "The broadcasting system is different and no thumbnail image can be displayed.", may appear in the text box 622. The text box 623 displays the title of the video work that corresponds to the thumbnail image 601 being displayed in the thumbnail window 610 where the cursor 603 is placed. The text box 624 is adapted to display the residual time period for which the recording device indicated in the text box 621 can be used for recording. The residual time is recognized by the CPU 500 via the interface 490.

The thumbnail index image 600 further includes a plurality of command buttons 631, 632. When the command button 631 is selected and operated by way of an input operation performed at the input operation section, it reads the video data of the video work that corresponds to the thumbnail image 601 being displayed in the thumbnail window 610 where the cursor 603 is placed and carries out a processing operation necessary for replaying the video work. When, on the other hand, the command button 632 is selected and operated by way of an input operation performed at the input operation section, it terminates the display of the thumbnail index image and returns to the prior image, which may be a menu for selecting some other functional feature.

[Operations of Player]

Now, operations of the above-described player 100 will be described below by referring to FIG. 1 and other related drawings.

(Data Recording)

Firstly, an operation of recording data will be described. For recording data, the input video data Svin input by way of a video input terminal (not shown) as analog signals are converted into digital signals in the video decoder 410 under the control of the CPU 500 and a predetermined decoding process is followed to output the obtained digital video data Svd to the AV processor 460. Additionally, the input audio data Sain input by way of an audio input terminal (not shown) as analog signals are converted into digital signals in the A/D converter 420 under the control of the CPU 500 and outputs to the AV processor 460 as digital audio data Sad.

Thus, the AV processor 460 acquires the digital video data Svd output from the video decoder 410 and the digital audio data Spa output from the A/D converter 420. Thereafter, the AV processor 460 exchanges necessary data with the memory 451 as memory signals Sm3 and performs a predetermined pre-processing operation on the digital video data Svd and the digital audio data Spa according to the control signal Sc4 from the CPU 500 so as to output them to the encoder 470 as processed video data Spv and processed audio data Spa. The AV processor 460 additionally operates to generate thumbnail video data from the processed video data Spv according to the control signal Sc4 from the CPU 500 so as to output the generated thumbnail video data to the encoder 470 as data correlated to the processed video data Spv.

Then, the encoder 470 acquires the processed video data Spv, the processed audio data Spa and the thumbnail video data output from the AV processor 460. Then, the encoder 470 exchanges necessary data with the memory 452 as memory signals Sm2 and performs a necessary synthesizing operation on the processed video data Spv, the processed audio data Spa and the thumbnail video data and a coding operation according to a predetermined format so as to output them as synthesized data Sm to the interface 490 according to the control signal Sc2 from the CPU 500.

The interface 490 outputs the synthesized data Sm either to the optical disc drive 200 or the HDD 300 either as record data Spd or record data Sdd according to the control signal Sc1 from the CPU that is generated on the basis of the specifications input by way of the input operation section, exchanging necessary data with the memory 455 as memory signals Sm1. In other words, the record data Spd are optically recorded on the optical disc mounted in the optical disc drive 200 when the synthesized data Sm are output to the optical disc drive 200 as record data Spd, whereas the record data Sdd are magnetically recorded on the HD mounted in the HDD 300 when the synthesized data Sm are output to the HDD 300.

(Data Reproduction)

Figure 3:
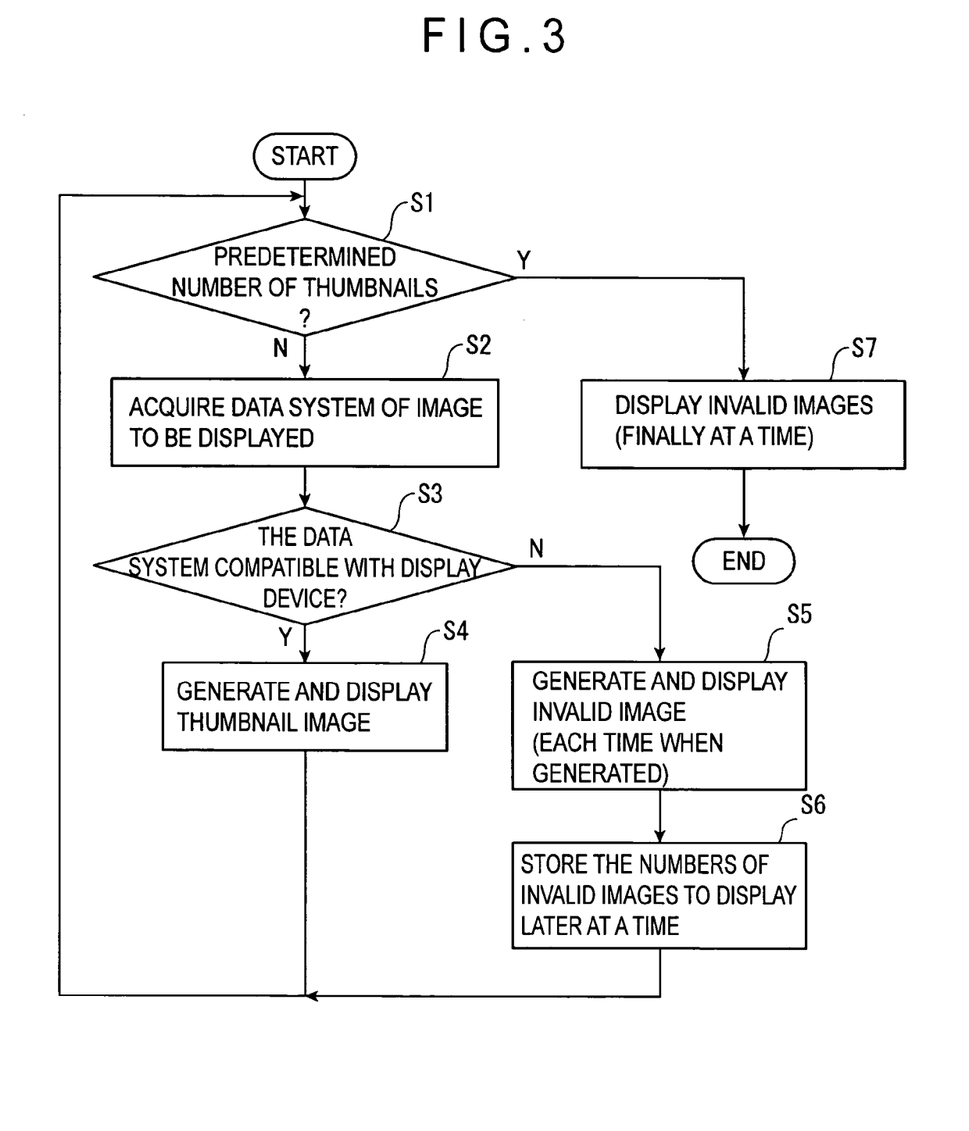
FIG. 3 is a flow chart of the processing operation of the embodiment for displaying a thumbnail index image.

Now, an operation of reproducing recorded data will be described by referring to the related drawings. FIG. 3 is a flow chart of the processing operation for displaying a thumbnail index image.

Firstly, as power is supplied to the player 100, the CPU 500 of the data processor 400 recognizes the devices connected to the data processor 400. In this embodiment, the CPU 500 recognizes that the optical disc drive 200 and the HDD 300 are connected to the data processor 400. Then, the CPU 500 causes the menu stored in the memory 455 in advance to be displayed on the display device. More specifically, the CPU 500 acquires the data relating to the image of the menu from the memory 455 and outputs control signal Sc4 to the AV processor 460 with the data relating to the image of the menu to have the AV processor 460 appropriating process the data relating to the menu and output the processed data to the display device from the video output terminal by way of the video encoder 430.

The user/viewer operates the input operation section by referring to the menu being displayed on the display device so as to have the input operation section output a signal for requesting a thumbnail index image to be displayed for the purpose of reproducing necessary data stored in the optical disc drive 200 and the HDD 300. As the CPU 500 recognizes the signal from the input operation section, it performs an operation as illustrated in FIG. 3 so as to display a thumbnail index image 600 as shown in FIG. 2. According to the present invention, it is not necessary for a menu to be automatically displayed on the display device when power is supplied to the player 100. In other words, it may be so arranged that a thumbnail index image 600 as shown in FIG. 2 may be displayed so that the user may select the starting image of any of the video works being shown in the thumbnail index image 600 by operating the input operation section.

When the CPU 500 performs an operation as illustrated in FIG. 3 so as to display a thumbnail index image 600 as shown in FIG. 2, the CPU 500 firstly recognizes the number of the video works and their respective titles stored in the optical disc or the HDD 300. Then, the CPU 500 specifies the number of thumbnail windows 610 in the thumbnail index image 600 for displaying thumbnail images 601. Then, as shown in FIG. 3, the CPU 500 determines if it acquires thumbnail images, the number of which is equal to the number it recognizes (Step S1).

If it is determined in the Step S1 that the CPU 500 does not acquire thumbnail images of the necessary number, the CPU 500 acquires thumbnail video data that correspond to predetermined identification data (Step S2). More specifically, the interface 490 is controlled by the control signal Sc1 from the CPU 500 so as to retrieve and acquire the thumbnail video data recorded in the optical disc of the optical disc drive 200 or the HD of the HDD 300. It may be so arranged that the thumbnail video data are acquired on a first-in first-out basis, on a last-in first-out basis, on a first-read first-out basis or on some other basis. Then, the CPU 500 determines if each of the thumbnail images 601 of the acquired thumbnail video data conforms to a predetermined data system or not. In this embodiment, the CPU 500 recognizes the data system on the basis of the data on the number of scanning lines. Thus, it determines if each of the thumbnail images 601 conforms to the PAL system, which is the predetermined scanning line system, or not (Step S3).

If it is determined in the Step S3 that the acquired thumbnail video data of a thumbnail image 601 conform to the predetermined data system, the thumbnail video data are decoded by the decoder 480 according to the control signal Sc3 from the CPU 500, post-processed by the AV processor 460 according to the control signal Sc4 from the CPU 500 and then so processed that the thumbnail image may be put into the predetermined thumbnail window 610 (Step S4). Then, the CPU 500 returns to the Step S1, where it repeats the operation of acquiring thumbnail video data until the number of thumbnail images it acquires agrees with the predetermined number. The operation of putting the thumbnail image 601 in the thumbnail window 610 in the Step S4 may alternatively be conducted in the Step S7, which will be described hereinafter. It may alternatively be so arranged that, in place of directly reading thumbnail video data, the decoder 480 selects a predetermined still image from the corresponding video data, decodes the video data of the still image and subsequently contracts/edits the still image to the size corresponding to the thumbnail window 610 before putting it into the thumbnail window 610.

If, on the other hand, it is determined in the Step S3 that the acquired thumbnail video data of a thumbnail image 601 do not conform to the predetermined data system, the AV processor 460 operates for putting an invalid image 602 showing a black background color into the thumbnail window 610 according to the control signal Sc4 from the CPU 500 (Step S5). More specifically, the AV processor 460 generates invalid video data to display an invalid image each time it is determined that the acquired thumbnail video data do not conform to the predetermined data system. However, it may alternatively be so arranged that, in place of displaying an invalid image each time, the thumbnail window identifying data of the thumbnail window 610 into which the invalid image 602 is put are stored in the memory 451 after the generation of the invalid video data in the Step S5 (Step S6) and the prepared invalid images may be collectively put into the respective thumbnail windows 610 in the Step S7, which will be described hereinafter.

After the Step S5, the CPU 500 returns to the Step S1, where it repeats the operation of acquiring thumbnail video data until the number of thumbnail images it acquires agrees with the predetermined number. If the CPU 500 generates invalid video data for each invalid image each time and displays the invalid image in the Step S5, it does not go to the next step, or the Step S6, and the following step, or the Step S7, becomes unnecessary.

If the CPU 500 recognizes that the number of thumbnail images 601 it acquires agree with the predetermined number in the Step S1, a thumbnail index image 600 as shown in FIG. 2 is displayed. If invalid video data are stored in the memory 451 in the Step S6, an invalid image sign 604 that is stored in the memory 455 in advance is superimposed on each of the invalid images 602 according to the window identification data of the windows and the invalid images 602 are made to appear finally at a time in the thumbnail index image 600 (Step S7). While the desired/selected scanning line system is the PAL system in the above description of the embodiment, the present invention is by no means limited thereto and the desired/selected scanning line system may be changed depending on the operation environment of the data processor. For example, the NTSC system may be selected as the desired/selected scanning line system and the images of the PAL system may be displayed as so many invalid images.

The user appropriately operates the input operation section and moves the cursor 603 to the thumbnail window 610 displaying the thumbnail image 601 of the video work he or she wants to observe. Then, the user operates the command button 631. In response to the operation of the command button, the CPU 500 recognizes the video data and the audio data that are correlated to the thumbnail image 601 being displayed in the selected thumbnail window 610. Then, the CPU 500 acquires the video data and the audio data respectively as record data Spd or record data Sdd from the optical disc drive 200 or the HDD 300 by way of the interface 490. Subsequently, the interface 490 outputs the record data Spd or the record data Sdd it acquires to the decoder 480 as reproduced data Sp according to the control signal Sc1 from the CPU 500, exchanging necessary data with the memory 454 as memory signals Sm1.

Additionally, the decoder 480 performs an operation of separating the audio data and the video data and an operation of decoding the video data and the audio data according to the control signal Sc3 from the CPU 500, exchanging necessary data with the memory 453 as memory signals Sm4. The decoded video data Svp and the decoded audio data Sap that are generated as a result of the decoding operation are then output to the AV processor 460. Thereafter, the AV processor 460 performs a post-processing operation on the decoded video data Svp and the decoded audio data Sap according to the control signal Sc4 from the CPU 500, exchanging necessary data with the memory 451 as memory signals Sm3. The processed video data Svdd and the processed audio data Sadd that are generated as a result of the post-processing operation are then output to the video encoder 430 and the D/A converter 440 respectively.

The video encoder 430 performs a predefined format converting operation and a predefined operation of analog conversion on the processed video data Svdd and outputs output video data Svout from the video output terminal as analog signals. The output video data Svout that are output from the video output terminal are used to display, or reproduce the original images on the display device that is connected to the video output terminal. On the other hand, the D/A converter 440 also performs a predefined operation of analog conversion on the processed audio data Sadd and outputs output audio data Saout from the audio output terminal as analog signals. The output audio data Saout that are output from the audio output terminal are amplified by the amplifier of the sounding unit that is connected to the audio output terminal and used to sound, or reproduce, the original sounds from the speaker. The processed video data Svdd and the processed audio data Sadd are processed synchronously so as to synchronize the timings of reproducing the respective data.

[Advantages of Player]

As described above, with this embodiment, a plurality of thumbnail images that are correlated respectively to the sets of video data and the sets of audio data recorded in the optical disc drive 200 and/or the HDD 300 are acquired and the data system of each of the thumbnail images is determined so that only the thumbnail images of the right data system are displayed on the display unit in the form of an index. Thus, if different data systems are used for the acquired plurality of thumbnail images, it is not necessary to thin out the scanning lines as a function of the thumbnail windows 610 and perform other related specific operations. Therefore, a player according to the invention can have a simple configuration to the advantage of productivity and cost reduction.

The video data of the thumbnail images are stored in the optical disc drive 200 and the HDD 300. Therefore, the processing time required for display the thumbnail index image can be reduced and the thumbnail index image can be displayed smoothly. Additionally, video data and audio data are stored in the optical disc drive 200 and the HDD 300 as record data Sdd and record data Spd respectively. Therefore, the processing time required for acquiring and reproducing video data and audio data according to the selected thumbnail image can be reduced to perform a replaying operation in an excellent manner.

Still additionally, as the user select one of the thumbnail images 601 being displayed in the respective thumbnail windows 610 of the thumbnail index image 600 by operating the input operation section and moving the cursor 603, the interface 490 acquires the related record data Sdd or the related record data Spd from the optical disc drive 200 or the HDD 300, whichever appropriate, and processes the acquired data at the decoder 480, the AV processor 460 and the video encoder 430 so as to reproduce the original images and the original sounds by way of the display device and the sounding unit respectively. Thus, if a thumbnail image 601 is formed by using a still image that is prepared from a part of the corresponding video data, the thumbnail image 601 can be displayed without requiring any additional processing operation to be performed on the display device and hence the video data can be reproduced without requiring any special processing operation. In other words, the user can easily recognize the video work he or she wants by seeing the thumbnail index image that can be displayed with a simple configuration.

Then, each thumbnail image 601 is formed by using a still image that is prepared from a part of the corresponding video data. Therefore, each thumbnail image 601 can be generated with ease and easily correlated to the original video data to improve the data processing efficiency. Additionally, since the data system of the original video data and that of the corresponding thumbnail image 601 are the same and identical with each other, the display device that can display the thumbnail image 601 can be used to replay the original video work. In other words, the user can select one of the thumbnail images 601 being displayed as a thumbnail index and replay the original video work easily and smoothly with a simple replaying operation.

Additionally, invalid images 602 are used for the thumbnail images of the data systems other than the data system of the thumbnail images being actually displayed in the thumbnail index. Therefore, it is possible to recognize that the video works having the titles whose thumbnail images are not displayed are stored in the optical disc and the HD. Still additionally, if the thumbnail images are formed respectively on the basis of the corresponding sets of video data, the user can easily recognize that the video works of the invalid images 602 have a data structure that cannot be used with the display device.

Furthermore, if an invalid image 602 is selected by the cursor 603 on the thumbnail index image 600, a text that reads as "The broadcasting system is different and no thumbnail image can be displayed.", may appear in the text box 622. Thus, if the invalid image 602 is only a black background image, the user can easily recognize the meaning of the black background image to a great convenience on the part of the user.

An invalid image sign 604 is superimposed on each invalid image 602 to clearly indicate that the corresponding thumbnail image 601 cannot be displayed there. Therefore, the user can clearly recognize the situation with a small amount of data necessary for displaying the image.

The CPU 500 recognizes the number of titles, or thumbnail images, to be displayed as a thumbnail index and acquires thumbnail images 601 or the invalid image 602, the number of which corresponds to the recognized number so that it displays the thumbnail images 601 in the respective thumbnail windows 610 that are defined as a function of the recognized number. Therefore, invalid image signs 604 can be superimposed on the respective invalid images 602 collectively at a time and the background of the thumbnail index image 600 can be made to appear in the invalid images 602 collectively. Such a collective processing operation can improve the efficiency of operation of the player.

A black background image is made to appear a thumbnail window 610 as invalid image 602. In other words, data for an invalid image 602 may be stored in the memory 451 in advance and a black background image may be put into a thumbnail window 610 by simply reading the data for an invalid image 602 when a set of video data is recognized as data of a different data system. The net result will be a reduced processing time necessary for displaying a thumbnail index to a great advantage on the part of the user. Additionally, since invalid images 602 are made to appear as monochromatic images, they require only a small amount of data and hence a small storage area so that the storage area of the memories can be effectively utilized and the operation of preparing invalid images 602 can be a simple one. Still additionally, since invalid images 602 are prepared simply by combining data, it is only necessary to recognize in advance that the data system of a certain video work is different from the valid data system of the player and it is no longer necessary to generate a thumbnail image for the video work by using a still image prepared by using part of the video data of the video work and subsequently recognizing the data system of the generated thumbnail image to a great advantage from the viewpoint of efficiency. The arrangement of generating a thumbnail image by using part of the video data of a video work or generating a thumbnail image with the data system same as that of the video work makes it possible to determine the data system of the thumbnail video data indirectly and easily by recognizing the data system of the video work without separating the thumbnail video data of the thumbnail image by means of the decoder 480.

Furthermore, only thumbnail images 601 of the data system that can be displayed on the display device are actually displayed on the display screen. Thus, it is not necessary for the prepared thumbnail index image 600 to be subjected to any subsequent processing operation in order to make it conform to the data system of the display device to a great advantage of improving the efficiency of operation. Additionally, the operation of combining the thumbnail windows 610 that match thumbnail images 601 of a data system same as that of the display device and the thumbnail images 601 to be actually displayed there can be easily carried out also to a great advantage of improving the efficiency of operation.

The data system of a thumbnail image is recognized by way of a broadcasting system. In other words, thumbnail images 601 of the same broadcasting system are displayed in the thumbnail index and only video data that correspond to the broadcasting system adapted to displaying thumbnail images are read. Thus, the operation of processing video to be used for displaying thumbnail images is facilitated and fine thumbnail images are displayed.

The number of scanning lines of each thumbnail image is recognized by the player in order to recognize the data system of the thumbnail image. In other words, the player can easily recognize any data system that is different from its own data system to a great advantage of improving the efficiency of operation. Thus, for example, the user can easily recognize the difference between the PAL system and the NTSC system having respective numbers of scanning lines that are different from each other. Hence, the user can easily understand the meaning of the thumbnail index being displayed on the display device.

Additionally, the difference of any two data systems can be recognized with ease by referring to color signals of the systems to a great advantage of improving the efficiency of operation. For example, it is easy to discriminate the PAL system and the SECAM system having the same number of scanning lines by referring to color signals of the two systems. Hence, the user can easily understand the meaning of the thumbnail index being displayed on the display device.

Finally, the CPU 500 and the AV processor 460 are provided with executable programs for various different functional features. In other words, the above-described operations of the player can be realized by installing the programs and/or using recording mediums storing the programs. Thus, a player according to the invention can find a broad scope of applications.

[Modifications of Embodiment]

The present invention is by no means limited to the above-described embodiment, which can be modified and altered in various different ways without departing from the scope of the invention.

While the video data and the audio data acquired from the video decoder 410 and the A/D converter 420 are appropriately processed and stored, and the video data and the audio data that are stored are appropriately read out and reproduced for use in the above description, the storage for storing the data may be omitted from the system so that the data may be delivered externally and directly reproduced for use. More specifically, referring to FIG. 4, it may alternatively be so arranged that a plurality of sets of video data of different data systems that are recorded in a storage 720 of a host device 700, by a transmitter 710 of the host device 700, which may be a server or a broadcasting key station, are transmitted to a network 800 and acquired by a player 100, which is a terminal device provided with a telecommunication tool, by way of the network 800 so that only thumbnail images 601 of the data system that matches the data system of the player 100 are actually displayed, while thumbnail images 601 of any other data systems are displayed as invalid images 602. As one of the thumbnail images 601 that are actually being displayed on the player is selected, the server delivers the video data and the audio data of the corresponding title to the player.

Figure 4:
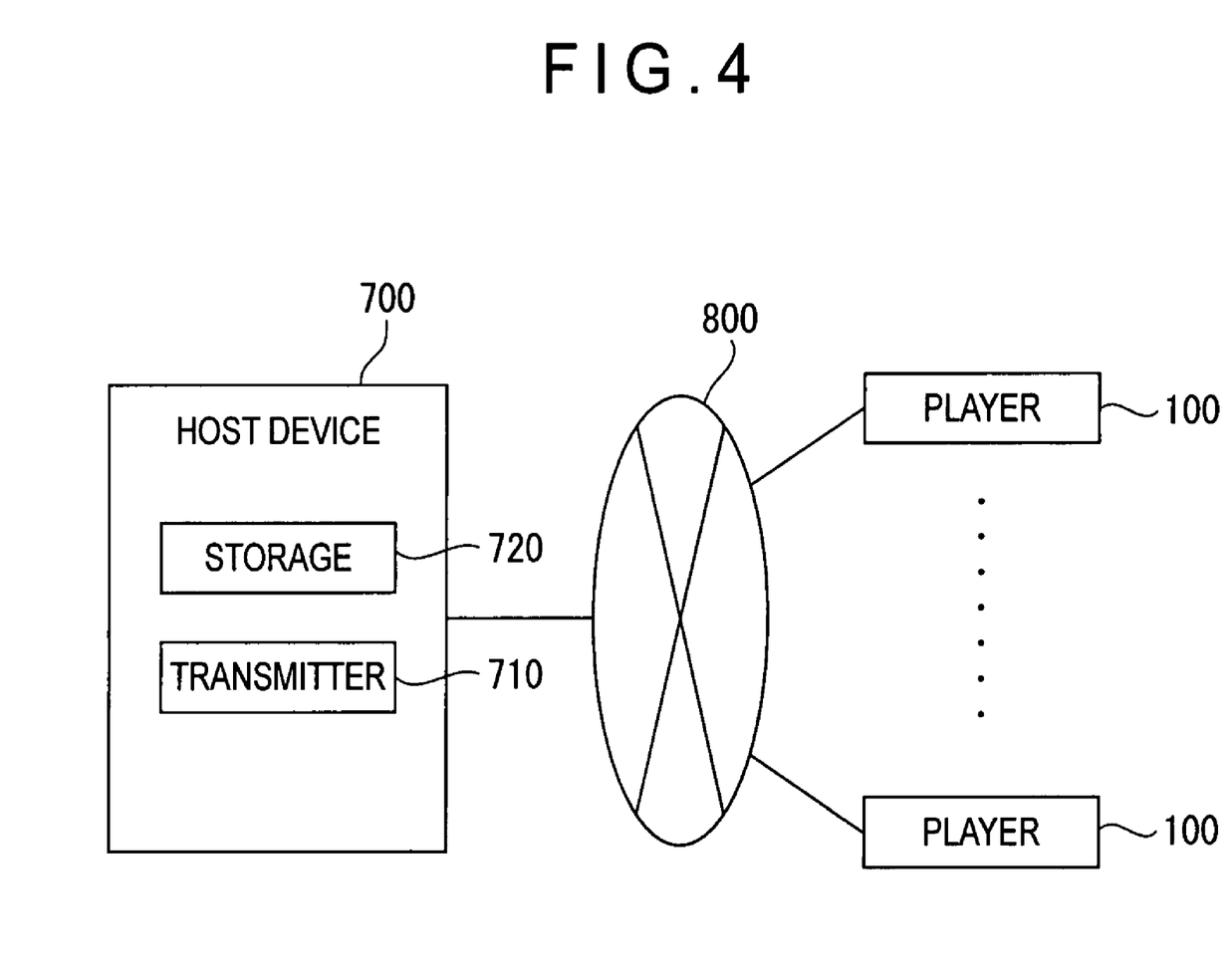
FIG. 4 is a schematic block diagram of another embodiment of data processing system according to the present invention.

Alternatively, it may be so arranged that the host device 700 delivers synoptic data of different data systems that are obtained by summarizing the video data and the audio data of various video works to the network 800 and the terminal device generates thumbnail images on the basis of the synoptic data and displays the corresponding thumbnail images on the display device of the terminal device. With an information processing system 900 where data are delivered to terminal devices via the network 800, it is no longer necessary for each terminal device to be provided with large memory areas such as an optical disc drive 200 and/or an HDD 300 so that the terminal devices can be made to have a simple configuration and the most update data can be delivered to the terminal devices. Obviously, such a system can find a broad scope of applications.

The network 800 is connected to the terminal devices and the host device. The network 800 is adapted to connect the terminal devices and the host device so that they can exchange information with each other. Examples of networks that can be used for the network 800 include the Internet adapted to operate on the basis of a general purpose protocol such as TCP/IP, intranets, LANs (local area networks), networks formed by a plurality of base stations that can exchange information by way of wireless mediums such as telecommunication networks and broadcasting networks and wireless mediums per se that can be used for the terminal devices and the host device to directly exchange information. For the purpose of the invention, wireless mediums include electric waves, light, sound waves and electromagnetic waves.

While a player according to the invention is provided with an optical disc drive 200 and an HDD 300 in the above description, it may alternatively be provided with either of them. Still alternatively, a magneto-optical (MO) disc, a memory card, a magnetic tape and/or an IC (Integrated Circuit) card may be used as storage mediums and drives and/or drivers for recording data to and reading data from them may be provided.

While video data and audio data are reproduced in the above description, information of any other types including character data, communication data, application software, various control programs and control signals for various machines may be selectively used for the purpose of the invention. Additionally, data may be provided not only by reproducing them from storages but also by outputting them from various data sources for the purpose of the invention.

Thumbnail images that can be used for identifying video data for the purpose of the present invention are not limited to still images formed by partly using the video data of original video works as described above. For example, thumbnail images may be synthetically generated by the data processor 400 or formed by using dedicated thumbnail video data that are prepared in advance. Invalid images 602 are not limited to those obtained by superimposing an invalid image sign 604 on black background images. Invalid images having an invalid image sign 604 may alternatively be prepared in advance. With such an arrangement, it is no longer necessary to superimpose an invalid image sign 604 to a great advantage of improving the efficiency of operation. While an exclamation mark is used as invalid image sign 604 in the above description, a sign similar to a traffic sign that attracts attention such as a no-parking sign, a hand image that indicates prohibition or characters that read as "display impossible" may alternatively be used so long as the user can easily recognize that a thumbnail image cannot be displayed.

An invalid image 602 may be simply displayed without superimposing an invalid image sign 604. With such an arrangement, the volume of data necessary for the invalid image 602 is small to reduce the load of the processing operation necessary for displaying an invalid image. If the invalid image 602 is stored in advance in the memory 451 or 455, the storage area necessary for storing it is reduced so that consequently the memory 451 or 455 can be used effectively. The background color of the invalid image 602 is not limited to black and any other color or a pattern may alternatively be used so long as the user can easily recognize that a thumbnail image cannot be displayed there.

The use of the invalid image 602 can be totally eliminated so long as the user can easily recognize that a thumbnail image cannot be displayed there by way of the display device. For example, the luminance and the hue in the thumbnail windows 610 may be controlled so as to show a blue background or the transparency of the thumbnail windows 610 may be controlled so as to display the background image of the thumbnail index image 600 there. When the use of the invalid image 602 is totally eliminated, it is no longer necessary to provide a storage area for storing the video data of the invalid image 602 so that the memory area of the memory can be used effectively. Additionally, it is no longer necessary to generate the invalid image 602 in advance and store it in a memory to a great advantage of improving the efficiency of operation. Additionally, it is no longer necessary to read the invalid image 602 and put it into a thumbnail window 610. In other words, it is only necessary to control the inside of the thumbnail window 610 to a great advantage of improving the efficiency of operation.

While thumbnail images 601 are displayed as a thumbnail index when reproducing the video data and the audio data recorded in the optical disc and the HD in the above description, they may be displayed when editing the video data and the audio data stored in there or to confirm the recorded contents. In short, they may be displayed at any time and not limited to the time of replay.

The above-described operations of a player according to the invention can be realized by a computer readable program. Then, the video data and the audio data are recorded in a recording medium with which a computer is provided and reproduced as the computer is operated. A player according to the invention may alternatively be a television set that includes a display device and a sounding unit as integral parts thereof or an apparatus provided with an optical disc drive 200 and an HDD 300 as integral parts thereof. Still alternatively, it may be an apparatus integrating all such devices. The computation device that can be used for the purpose of the invention may be a personal computer, an arrangement formed by combining a plurality of computers by way of a network, an element such as microcomputer or a circuit board carrying a plurality of electronic parts.

The present invention is by no means limited to the above-described embodiment and modifications, which may be modified and/or altered without departing from the scope of the present invention.

What is claimed is:

1. A data processor for processing video data so as to make them adapted to be output, the processor comprising:
    a specific image acquirer for acquiring a plurality of specific images correlated to the data;
    a data system determiner for determining the data system of each of the specific images; and
    an index display controller for causing a display unit to display an index of the specific images of the plurality of acquired specific images,
    wherein the index comprises (a) thumbnail images of specific images in a data system that is recognized by the data system determiner, and (b) invalid images of specific images in a data system that is not recognized by the data system determiner, and
    wherein the invalid images are in the recognized data system.

2. The data processor according to claim 1, further comprising: a storage for storing the specific images acquired by the specific image acquirer.

3. The data processor according to claim 1, further comprising:
    an input device for selecting at least one of the specific images displayed on the display unit;
    a data acquirer for acquiring the data correlated to the selected specific image; and
    a processor for processing the acquired data to make them adapted to be output from an output device.

4. The data processor according to claim 1, wherein the index display controller includes a number of images recognizer for recognizing the number of the specific images acquired by the specific image acquirer, a display window definer for defining display windows on the display unit for respectively displaying the specific images corresponding to the number recognized by the number of images recognizer and a replacing device for displaying invalid images in the display windows of the specific images other than the specific images displayed on the display unit as an index.

5. The data processor according to claim 1, wherein the invalid images are predefined images.

6. The data processor according to claim 1, further comprising:
    an invalid image generator for generating an invalid image on the basis of determination by the data system determiner,
    wherein the index display controller displays an index including the invalid images generated by the invalid image generator so as to replace the specific images of the data systems other than the data system of the specific images to he displayed on the display unit along wit the specific images to be displayed on the display unit.

7. The data processor according to claim 1, wherein the data system determiner is adapted to determine the data system of each of the specific images to be displayed on the display unit by the data structure thereof.

8. The data processor according to claim 1, wherein the data system determiner is adapted to determine the data system of each of the specific images to be displayed on the display unit by the broadcasting system of the specific image.

9. The data processor according to claim 1, wherein the data system determiner is adapted to determine the data system of each of the specific images to be displayed on the display unit by recognizing the number of scanning lines of the specific image.

10. The data processor according to claim 1, wherein the data system determiner is adapted to determine the data system of each of the specific images to be displayed on the display unit by recognizing the color signal system of the specific image.

11. The data processor according to claim 1, wherein the data system determiner determines the data system including terrestrial analog broadcasting system, high definition television system, and terrestrial digital broadcasting system.

12. The data processor according to claim 1, wherein the thumbnail images are acquired on a first-in, first-out basis, lasting first-out basis, or a first-read first-out basis.

13. A data processing system comprising:
    a data processor for processing data so as to make them adapted to be output, the processor including:
    a specific image acquirer for acquiring a plurality of specific images correlated to the data;
    a data system determiner for determining the data system of each of the specific images; and
    an index display controller for causing a display unit to display an index of the specific images of the plurality of acquired specific images,
    wherein the index comprises (a) thumbnail images of specific images in a data system that is recognized by the data system determiner, and (b) invalid images of specific images in a data system that is not recognized by the data system determiner, and
    wherein the invalid images are in the recognized data system; and
    a host device connected to the data processor via a network and adapted to transmit desired data to the data processor.

14. A data processing system comprising:
    a host device having a storage for storing data and a transmitter for transmitting the data to a network; and
    a terminal device having a specific image acquirer for acquiring a plurality of specific images correlated to the data transmitted to the network, a data system determiner for determining the data system of each of the specific images and an index display controller for causing a display unit to display an index of the specific images of the plurality of acquired specific images, wherein the index comprises (a) thumbnail images of specific images in a data system that is recognized by the data system determiner, and (b) invalid images of specific images in a data system that is not recognized by the data system determiner, and wherein the invalid images are in the recognized data system.

15. The data processing system according to claim 14, wherein the terminal device includes an input device to be used for selecting at least one of the specific images displayed as index on the display unit in response to a predetermined input operation, and wherein the data correlated to the selected specific image is transmitted from the host device and received by the terminal device via the network.

16. A data processing system comprising:

a host device having a storage for storing data and a transmitter for transmitting the data to a network; and a terminal device having a data acquirer for acquiring the data transmitted to the network, a specific image generator for generating specific images of the data system same as the data system of the data so as to represent the contents of the data and an index display controller for causing a display unit to display an index of the specific images generated by the specific image generator, wherein the index comprises (a) thumbnail images of specific images in a data system that is recognized by the data system determiner, and (b) invalid images of specific images in a data system that is not recognized by the data system determiner, and wherein the invalid images are in the recognized data system.

17. The data processing system according to claim 16, wherein the terminal device includes an input device to be used for selecting at least one of the specific images displayed as index on the display unit in response to a predetermined input operation, and wherein the data correlated to the selected specific image is transmitted from the host device and received by the terminal device via the network.

18. A data processing method for processing data so as to make them adapted to be output, comprising the steps of:

acquiring a plurality of specific images correlated to the data;

determining the data system of each of the specific images; and after determining the data systems of the specific images,
(a) displaying on the display unit thumbnail images of specific images in a data system that is recognized, and
(b) displaying on the display unit an invalid image correlating to each of the specific images of any of the data systems that are not recognized.

19. The data processing method according to claim 18, further comprising the steps of:

after determining the data systems of the specific images, correlating an invalid image not adapted to be displayed on the display unit to each of the specific images of any of the data systems other than the data system of the specific images to be displayed on the display unit; and displaying the specific images and the invalid images on the display unit as index.

20. A computer-readable recording medium having recorded thereon a set of computer-executable instructions for performing a data processing method, the set of instructions comprising at least an instruction for:

acquiring a plurality of specific images correlated to the data;

determining the data system of each of the specific images; and after determining the data systems of the specific images,
(a) displaying on the display unit thumbnail images of specific images in a data system that is recognized, and
(b) displaying on the display unit an invalid image correlating to each of the specific images of any of the data systems that are not recognized.

21. A computer-readable recording medium having recorded thereon a set of computer-executable instructions for performing a data processing method, the set of instructions comprising at least an instruction for:

acquiring a plurality of specific images correlated to the data;

determining the data system of each of the specific images;

causing a display unit to display an index of the specific images the plurality of specific images;

after determining the data systems of the specific images,
(a) displaying on the display unit thumbnail images of specific images in a data system that is recognized, and
(b) displaying on the display unit an invalid image correlating to each of the specific images of any of the data systems that are not recognized.

22. A player comprising:

a display unit; and a data processor for processing data so as to make them adapted to be output, the processor including:

a specific image acquirer for acquiring a plurality of specific images correlated to the data;

a data system determiner for determining the data system of each of the specific images; and an index display controller for causing a display unit to display on index of the specific images of the plurality of acquired specific images, wherein the index comprises (a) thumbnail images of specific images in a data system that is recognized by the data system determiner, and (b) invalid images of specific images in a data system that is not recognized by the data system determiner, and wherein the invalid images are in the recognized data system.

23. In an image processor including a display and device to read sets of image data from a recording medium, wherein the image data are recorded in a record system and the image processor employs a processing system, and the record system and the processing system are chosen from image systems including the NTSC system, the PAL system, and the SECAM system, and wherein the image processor displays identifying thumbnail images on the display, each thumbnail image corresponding to one set of image data on the recording medium:

a method of displaying the thumbnail images on the display, the method comprising:

when a set of image data is recorded in one of the image systems that differs from another one of the image system being employed by the processor, displaying in the place of the thumbnail image of the set of image data an invalid image to clearly indicate that a corresponding thumbnail image in the system of the processor cannot be displayed there.

24. The method according to claim 23, wherein the invalid image comprises an invalid image sign including at least one of text or graphic image.

* * * * *